3,296,150
ORGANOPOLYLITHIUM POLYMERIZATION INITIATORS AND THEIR PREPARATION
Gerald R. Kahle, Bartlesville, Okla., assignor to Phillips Petroleum Company, a corporation of Delaware
No Drawing. Filed Aug. 27, 1962, Ser. No. 219,787
4 Claims. (Cl. 252—431)

This invention relates to the preparation of polymers of conjugated dienes. In accordance with one aspect, this invention relates to an improved method for preparing organopolylithium polymerization initiators. In another aspect, this invention relates to the initiator compositions thus prepared and to the use of these initiators in the polymerization of conjugated dienes.

In recent years, there has been a great deal of activity in the development of processes for producing olefin polymers. Polymers of monoolefins such as ethylene and propylene, prepared by these processes have received wide acceptance by many industries. The more recent discovery in the field of diene polymerization of certain so-called stereospecific catalysts, which make possible the formation of polymers having a desired configuration, has aroused considerable interest. The polymers formed by the use of these catalysts often have outstanding physical properties which render them equal to or even superior to natural rubber.

Among the various new polymers developed in the solution polymerization of conjugated dienes using organometal initiator systems are the high cis polymers of isoprene prepared in the presence of organopolylithium initiators. Reaction products of lithium with polyaryl-substituted ethylenes are effective initiators for the polymerization of conjugated dienes, either alone or in admixture with each other, or in admixture with other types of polymerizable monomers. Heretofore, these reaction products, or adducts, have generally been prepared in polar solvents such as ethers and the method is satisfactory so far as adduct formation is concerned. A polar solvent is, however, undesirable in polymerization systems where the production of certain types of polymers, e.g., high cis-polyisoprene and low vinyl polybutadiene, is desired. A polar solvent causes a decrease in the cis content of polyisoprene and an increase in the vinyl content of polybutadiene.

One method which has been proposed for circumventing the difficulties accompanying the use of a polar solvent involves the replacement of a substantial portion of it with a hydrocarbon diluent such as a paraffin, cycloparaffin, or aromatic hydrocarbon, e.g. benzene, toluene, or the like. By suitable adjustment of operating procedures, the quantity of the polar solvent can be drastically reduced and its effect on subsequent polymerizations minimized. One disadvantage in this type of process is that two steps are necessary for the preparation of the initiator. In addition, replacement of one medium with another will obviously increase operating costs.

The present invention is primarily concerned with an improved process for the preparation of organopolylithium initiators and to their subsequent use for the polymerization of conjugated dienes wherein the disadvantages of the prior art preparation processes are obviated.

Accordingly, an object of this invention is to provide novel conjugated diene polymerization initiator compositions.

Another object of this invention is to provide a method for preparing organopolylithium initiators.

A further object of this invention is to provide an improved polymerization process for polymerizing conjugated dienes in the presence of organopolylithium initiators.

Other and further objects and advantages of the invention will become apparent to those skilled in the art upon consideration of the accompanying disclosure and the appended claims.

According to the invention, it has now been found that reaction products of lithium with polyaryl-substituted ethylenes can be prepared in a single step in the presence of an acetylenic compound as the reaction medium. It has been further found that these reaction products are very effective initiators for the polymerization of conjugated dienes. It has been found that polyisoprene prepared with the initiators prepared according to the invention has a much higher cis content than that obtained from initiator systems containing polar solvents such as ethers. It has also been found that butadiene polymers obtained employing the initiators prepared according to the invention have a much lower vinyl content than when prepared in systems containing ethers or other polar solvents.

Acetylenic compounds employed as media for the reaction of lithium with polyaryl-substituted ethylenes according to the invention are liquid under the reaction conditions and the triple bond is in an internal position. Acetylenic compounds that can be employed according to the invention have the structural formula:

$$R-C\equiv C-R$$

wherein R is a hydrocarbon radial selected from alkyl, aryl and cycloalkyl radicals and combinations of these. The acetylenic compounds employed generally contain from 4 to 20, inclusive, carbon atoms. Acetylenic compounds preferred are those containing from 4 to 10 total carbon atoms per molecule.

Representative examples of acetylenic compounds that can be employed include 2-butyne (dimethylacetylene), 2-pentyne, 4-methyl-2-pentyne, 2-hexyne, 3-hexyne, 2-heptyne, 3-heptyne, 4-methyl-3-heptyne, 2-octyne, 3-octyne, 4-nonyne, 2-decyne, 5-decyne, dodecyne, 6-dodecyne, 3-butyl-5-octyne, 8-tetradecyne, 2-hexadecyne, 3-octadecyne, 6,6-diethyl-2-hexadecyne, 2-eicosyne, diphenylacetylene, 1-phenyl-1-propyne (methylphenylacetylene), 1-phenyl-1-butyne (ethylphenylacetylene), dibenzylacetylene, dicyclohexylacetylene, dicyclopentylacetylene, 1-cyclohexyl-1-butyne (ethycyclohexylacetylene), cyclohexylphenylacetylene, cyclohexylcyclopentylacetylene, and the like.

According to the invention, lithium is contacted under reaction conditions with at least one polyaryl-substituted ethylene in at least one of the above-defined acetylenic compounds as the reaction medium. The polyaryl-substituted ethylenes that can be employed include those compounds which contain 2, 3 or 4 aryl groups such as phenyl and/or naphthyl, for example, 1,1-diphenylethylene, 1,2-diphenylethylene (stilbene), triphenylethylene, tetraphenylethylene, 1-phenyl-1-naphthylethylene, 1,2-dinaphthylethylene, 1,1-diphenyl-2-naphthylethylene, trinaphthylethylene and the like.

The lithium employed for preparing the initiators of the invention can be used in any form desired such as wire, chunks, or shot, or in a finely divided state. When preparing the initiators, the lithium and polyaryl-substituted ethylene are contacted in an acetylenic hydrocarbon reaction medium under mild agitation conditions, or vigorous agitation if desired, in an inert atmosphere such as argon, helium, krypton, xenon, neon, methane, ethane, and the like. The time required for formation of the reaction product depends upon various factors such as temperature, rate of agitation, ratio of reactants, and the like. In general, the time required is in the range of from about 10 minutes to 100 hours or longer. The temperature employed for reacting lithium with the polyaryl-substituted ethylene generally ranges from about −20 to 100° C. The acetylenic hydrocarbons employed as the reaction media for preparing the initiators of this invention do not polymerize under the conditions employed either for preparing the initiators or for subsequent polymerization.

The monomers which can be polymerized in the presence of the lithium initiators of our invention are conjugated dienes containing from 4 to 12 carbon atoms, preferably 4 to 8 carbon atoms per molecule. Examples of suitable conjugated dienes that can be used include 1,3-butadiene, 2-methyl-1,3-butadiene (isoprene), 2,3-dimethyl-1,3-butadiene, 1,3-pentadiene, 2-methyl-1,3-pentadiene, 2,3-dimethyl-1,3-pentadiene, 3-methyl-1,3-pentadiene, 2-phenylbutadiene, 3-butyl-1,3-octadiene, 3,4-dimethyl-1,3-hexadiene, and the like. Conjugated dienes containing halogen and alkoxy substituents along the chain can also be employed, such as chloroprene, fluoroprene, 2 - methoxy-1,3-butadiene, 2-ethoxy-3-ethyl-1,3-butadiene, and 2-ethoxy-3-methyl-1,3-hexadiene. Conjugated dienes can be polymerized alone or in admixture with each other to form copolymers, or block copolymers. Block copolymers can be prepared from two or more conjugated dienes by charging one compound initially, allowing it to polymerize, and then adding a second conjugated diene and allowing it to polymerize.

As hereinbefore mentioned, the initiators described herein are of particular interest for the production of high cis polyisoprene and butadiene homopolymers and copolymers in which the conjugated diene portion has a low vinyl content. The polyisoprene product obtained according to the invention has a raw cis content above 60 percent and generally above 70 percent.

In addition to homopolymers and copolymers of conjugated dienes, copolymers of conjugated dienes with other monomers containing a $CH_2=C<$ group, such as vinyl-substituted aromatic compounds, can be made by the process of this invention. The vinyl-substituted aromatic compounds include styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these aromatic monomers include 3-methylstyrene (3-vinyltoluene),
3,5-diethylstyrene,
4-n-propylstyrene,
2,4,6-trimethylstyrene,
4-dodecylstyrene,
3-methyl-5-n-hexylstyrene,
4-cyclohexylstyrene,
4-phenylstyrene,
2-ethyl-4-benzylstyrene,
4-p-tolylstyrene,
3,5-diphenylstyrene,
2,4,6-tri-tert-butylstyrene,
2,3,4,5-tetramethylstyrene,
4-(4-phenyl-n-butyl)styrene,
3-(4-n-hexylphenyl)styrene-4-methoxystyrene,
3,5-diphenoxystyrene,
3-decoxystyrene,
2,6-dimethyl-4-hexoxystyrene,
4-dimethylaminostyrene,
3,5-diethylaminostyrene,
4-methoxy-6-di-n-propylaminostyrene,
4,5-dimethyl-1-vinylnaphthalene,
3-ethyl-1-vinylnaphthalene,
6-isopropyl-1-vinylnaphthalene,
2,4-diisopropyl-1-vinylnaphthalene,
3,6-di-p-tolyl-1-vinylnaphthalene,
6-cyclohexyl-1-vinylnaphthalene,
4,5-diethyl-8-octyl-1-vinylnaphthalene,
3,4,5,6-tetramethyl-1-vinylnaphthalene,
3,6-di-n-hexyl-1-vinylnaphthalene,
8-phenyl-1-vinylnaphthalene,
5-(2,4,6-trimethylphenyl)-1-vinylnaphthalene,
3,6-diethyl-2-vinylnaphthalene,
7-dodecyl-2-vinylnaphthalene,
4-n-propyl-5-n-butyl-2-vinylnaphthalene,
6-benzyl-2-vinylnaphthalene,
3-methyl-5,6-diethyl-8-n-propyl-2-vinylanphthalene,
4-o-tolyl-2-vinylnaphthalene,
5-(3-phenyl-n-propyl)-2-vinylnaphthalene,
4-methoxy-1-vinylnaphthalene,
6-phenoxy-1-vinylnaphthalene,
3,6-dimethylamino-1-vinylnaphthalene,
7-dihexoxy-2-vinyl-naphthalene, and the like. Block or random copolymers of conjugated dienes and vinyl-substituted aromatic compounds can be formed. The presence of a small amount of polar compound encourages random copolymerization between conjugated dienes and vinyl-substituted aromatic compounds.

Block copolymers can also be prepared from conjugated dienes and polar monomers which are introduced after the conjugated diene has polymerized. These polar monomers include vinylpyridines and vinylquinolines such as 2-vinylpyridine,
4-vinylpyridine,
3,5-diethyl-4-vinylpyridine,
5-methyl-2-vinylpyridine,
5-n-octyl-2-vinylpyridine,
3-n-dodecyl-2-vinylpyridine,
3,5-di-n-hexyl-4-vinylpyridine,
5-cyclohexyl-2-vinylpyridine,
4-phenyl-2-vinylpyridine,
3,5-di-tert-butyl-2-vinylpyridine,
3-benzyl-4-vinylpyridine,
6-methoxy-2-vinylpyridine,
4-phenoxy-2-vinylpyridine,
4-dimethylamino-2-vinylpyridine,
3,5-dimethyl-4-diamylamino-2-vinylpyridine,
2-vinylquinoline,
4-vinylquinoline,
2-tert-butyl-4-vinylquinoline,
3-methyl-4-vinylquinoline,
3-cyclohexyl-4-vinylquinoline,
3-methyl-4-ethoxy-2-vinylquinoline,
1-vinylisoquinoline,
3-vinylisoquinoline,
4-tert-dodecyl-1-vinylisoquinoline,
3-dimethylamino-3-vinylisoquinoline,
4-benzyl-3-vinylisoquinoline,
4-phenyl-1-vinylisoquinoline, and the like.

Other polar monomers include acrylic and alkacrylic acid esters, nitriles and N,N-disubstituted amides, such as methyl acrylate, ethyl acrylate, butyl acrylate, methyl methacrylate, ethyl methacrylate, propyl methacrylate, butyl methacrylate, methyl ethacrylate, ethyl ethacrylate, isopropyl ethacrylate, acrylonitrile, methacrylonitrile, N,N - dimethylacrylamide, N,N - diethylmethacrylamide, and the like. Vinylfuran and N-vinylcarbazole can also be used.

When it is desired that the polymer formed exhibit rubbery characteristics the conjugated diene should be employed as a major amount of the monomer polymerized. The initiator compositions prepared according to this invention are particularly valuable in forming these conjugated diene polymers. It should be understood, however, that these initiator compositions can also be used when preparing homopolymers or copolymers of the vinyl-substituted aromatic compounds or the polar monomers named. Also, block copolymers can be formed between the vinyl-substituted aromatic compounds and these polar monomers.

The amount of initiator employed will vary depending on the polymer prepared and particularly the molecular weight desired. In general, however, the amount of initiator employed will range from about 0.1 to 100 millimoles per hundred grams of monomer with the preferred range being from about 0.25 to 30 millimoles per hundred grams of monomer.

The polymerization reaction is generally carried out at a temperature ranging from about −100 to about 150° C., preferably from about −75 to about +75° C. The particular temperature employed will depend on both the monomers and the initiator used in preparing the polymers. It is preferred that the polymerization be carried out in the presence of a suitable diluent, such as benzene, toluene, cyclohexane, methylcyclohexane, xylene, n-butane, n-hexane, n-heptane, isooctane, or the like. Generally, the diluent is selected from hydrocarbons, for example paraffins, cycloparaffins, or aromatics containing from 4 to 10 carbon atoms per molecule.

Numerous variations in operative procedure can be employed. The process of the invention can be carried out as a batch process by charging monomer or monomers into a reactor containing initiator and diluent.

If desired, the organopolylithium initiator dispersed in an acetylenic hydrocarbon (reaction medium) can be first charged to a suitable reactor, which can contain diluent, and then charge the monomer to the reactor. The hydrocarbon diluent used for polymerization can be charged along with the initiator or monomer or both. In all cases the polymerization is preferably carried out in an inert atmosphere such as an atmosphere of nitrogen, helium, argon, or the like.

The polymers that are prepared according to the invention can range from liquids to solid rubbery materials. The unquenched polymer solutions can be treated with various reagents to introduce functional groups replacing the terminal lithium atoms on the polymer molecule resulting from the polymerization itself. For example, polymer in solution can be contacted with carbon dioxide to replace the lithium atoms with —COOH groups. Other functional groups which can be introduced include —SH, —OH, halogen and the like.

As indicated above, the polymer products can range from liquids to rubbery materials and the liquid polymers can subsequently be cured to form solids. The polymers can be compounded by the various methods such as have been used in the past for compounding natural and synthetic rubbers using, for example, a roll mill or a Banbury mixer. Reinforcing agents such as carbon black and mineral fillers, plasticizers, vulcanizing agents, vulcanization accelerators, antioxidants, and the like such as have been employed in natural and synthetic rubbers can be used when compounding the rubbery polymers of the invention. The polymers of the invention can be blended with other polymers such as natural rubber, other synthetic rubbers, polyolefins such as polyethylene, and the like.

The polymeric products of the invention are useful as adhesives, potting compounds, sealants, tread stocks, and for making many types of molded objects.

A more comprehensive understanding of the invention can be obtained by referring to the following illustrative examples which are not intended, however, to be unduly limitative of the invention.

*Example 1*

A polymerization initiator was prepared by the reaction of lithium with trans-stilbene (1,2-diphenylethylene) in 3-hexyne as the reaction medium. The reaction was effected in an atmosphere of argon. The following recipe was employed:

| | |
|---|---|
| Trans-stilbene, mole | 0.1 |
| Lithium wire, gram atom | 0.3 |
| 3-hexyne, moles | 0.5 |
| Temperature, °F. | 122 |
| Time, days | 5 |
| Molarity* | 0.11 |

*Determined by withdrawing a sample and titrating it with 0.1 N HCl.

The reaction product, 1,2-dilithio-1,2-diphenylethane or lithium stilbene adduct, was employed as the initiator for the production of cis-polyisoprene in accordance with the following recipe:

| | |
|---|---|
| Isoprene, parts by weight | 100 |
| n-Pentane, parts by weight | 1000 |
| Initiator, millimoles | 10 |
| Temperature, °F. | 122 |
| Time, hours | 48 |
| Conversion, percent | 50 |

Pentane was charged first, the reactor was purged with nitrogen, isoprene was added, and then the initiator. At the conclusion of the polymerization, the reaction was shortstopped with isopropyl alcohol to which was added the antioxidant, 2,2′-methylene-bis(4-methyl-6-tert-butylphenol) dissolved in isopropyl alcohol. One part by weight per 100 parts polymer of the antioxidant was used. The product was coagulated with isopropyl alcohol, separated, and dried. It had the following properties:

| | |
|---|---|
| Inherent viscosity[1] | 2.43 |
| Gel, percent[2] | 0 |
| cis, percent: | |
|     Raw | 72 |
|     Normalized | 88.6 |
| 3,4-addition, percent: | |
|     Raw | 9.3 |
|     Normalized | 11.4 |

[1] One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.

[2] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

These data show that high-cis polyisoprene can be obtained using an initiator prepared in an acetylenic medium.

*Example II*

The lithium-stilbene adduct described in Example I was employed as the initiator for the polymerization of butadiene. The following recipe was used:

| | |
|---|---|
| 1,3-butadiene, parts by weight | 100 |
| Cyclohexane, parts by weight | 780 |
| Initiator, millimoles | 5 |
| Temperature, °F. | 122 |
| Time, hours | 48 |
| Conversion, percent | 98 |

The procedure for preparation and recovery of the polymer was the same as in Example I. The product had the following properties:

| | |
|---|---|
| Inherent viscosity[1] | 3.9 |
| Gel, percent[2] | 0 |
| Microstructure, percent: | |
|     cis, by difference | 44.8 |
|     trans | 47.8 |
|     Vinyl | 7.4 |

See footnotes 1 and 2 above.

Example III

A polymerization initiator was prepared by the reaction of lithium with trans-stilbene (1,2-diphenylethylene) in cyclohexane as the reaction medium. The reaction was effected in an atmosphere of argon. The following recipe was employed:

| | Moles |
|---|---|
| Trans-stilbene | 1.0 |
| Lithium wire | 3.0 |
| Cyclohexane | 5.0 |
| Temperature, ° F., argon atmosphere | 122 |

The molarity was determined by withdrawing a sample of the reaction mixture and titrating it with 0.1 N HCl.

The reaction mixture obtained had the following molarity after various reaction periods:

| | |
|---|---|
| Theor. molarity | 1.39 |
| Molarity after: | |
| 5 days | 0.01 |
| 8 days | 0.03 |
| 14 days | 0.06 |
| 36 days | 0.09 |

The reaction product obtained above was employed as the initiator for the polymerization of isoprene in accordance with the following recipe:

| | |
|---|---|
| Isoprene | 100 |
| n-Pentene | 1000 |
| Initiator, millimoles | 5 and 10 |

Charge order: n-Pentane, nitrogen purge, isoprene, initiator, 20 hours polymerization period.

There was no conversion of isoprene to polymer after 20 hours either with 5 or 10 millimoles of initiator prepared in cyclohexane.

Microstructures in the above examples were determined using a commercial infrared spectrometer. The samples were dissolved in carbon disulfide so as to form a solution containing 25 grams of polymer per liter of solution. Calibrations were based on deproteinized natural rubber as a reference material assuming that it contained 98 percent cis and 2 percent 3,4-addition product. The cis was measured at the 8.9 micron band and 3,4-addition at the 11.25 micron band. In the presence of a high cis-polyisoprene, trans is not detectable since trans is measured at the 8.75 micron band. The raw cis and raw 3,4-addition are converted to normalized values (assuming cis+3,4-addition=100) as follows:

$$\frac{\text{raw cis percent}}{\text{raw cis percent}+\text{raw 3,4-addition, percent}}(100)$$
$$=\text{normalized cis percent}$$

$$\frac{\text{raw 3,4-addition percent}}{\text{raw cis percent}+\text{raw 3,4-addition, percent}}(100)$$
$$=\text{normalized 3,4-addition percent}$$

It will be evident to those skilled in the art that many variations and modifications can be practiced upon consideration of the foregoing disclosure. Such variations and modifications are believed to be within the spirit and scope of the present invention.

I claim:

1. A process for forming an organopolylithium polymerization initiator composition which comprises contacting lithium with a polyaryl-substituted ethylene compound containing from 2 to 4 aryl groups selected from the group consisting of phenyl and naphthyl in an inert nonpolymerizable reaction medium comprising an acetylenic hydrocarbon material having from 4 to 20, inclusive, total carbon atoms having the structural formula:

$$R\text{—}C\equiv C\text{—}R$$

wherein R is a hydrocarbon radical selected from alkyl, aryl, and cycloalkyl radicals and combinations of these at a temperature in the range —20 to 100° C.

2. A process according to claim 1 wherein at least 2 moles of lithium are contacted with each mole of said ethylene compound.

3. A process according to claim 1 wherein said compound is 1,2-diphenylethylene (trans-stilbene).

4. A process for forming an organopolylithium polymerization initiator composition which comprises contacting (a) lithium with (b) 1,2-diphenylethylene in (c) 3-hexyne at a temperature in the range —20 to 100° C.

References Cited by the Examiner

UNITED STATES PATENTS

| 2,898,327 | 8/1959 | McCulloch et al. | 252—431 |
| 3,048,568 | 8/1962 | Cleary | 260—94.2 |
| 3,159,587 | 12/1964 | Uraneck et al. | 260—94.2 |
| 3,170,903 | 2/1965 | Stearns | 260—94.2 |

FOREIGN PATENTS

| 817,695 | 8/1959 | Great Britain. |

JOSEPH L. SCHOFER, *Primary Examiner.*

LEON J. BERCOVITZ, *Examiner.*

C. R. REAP, I. CANTOR, *Assistant Examiners.*